Sept. 19, 1967   M. A. PAHLAVAN   3,343,155
DISPLAY APPARATUS
Filed Jan. 6, 1964   5 Sheets-Sheet 1
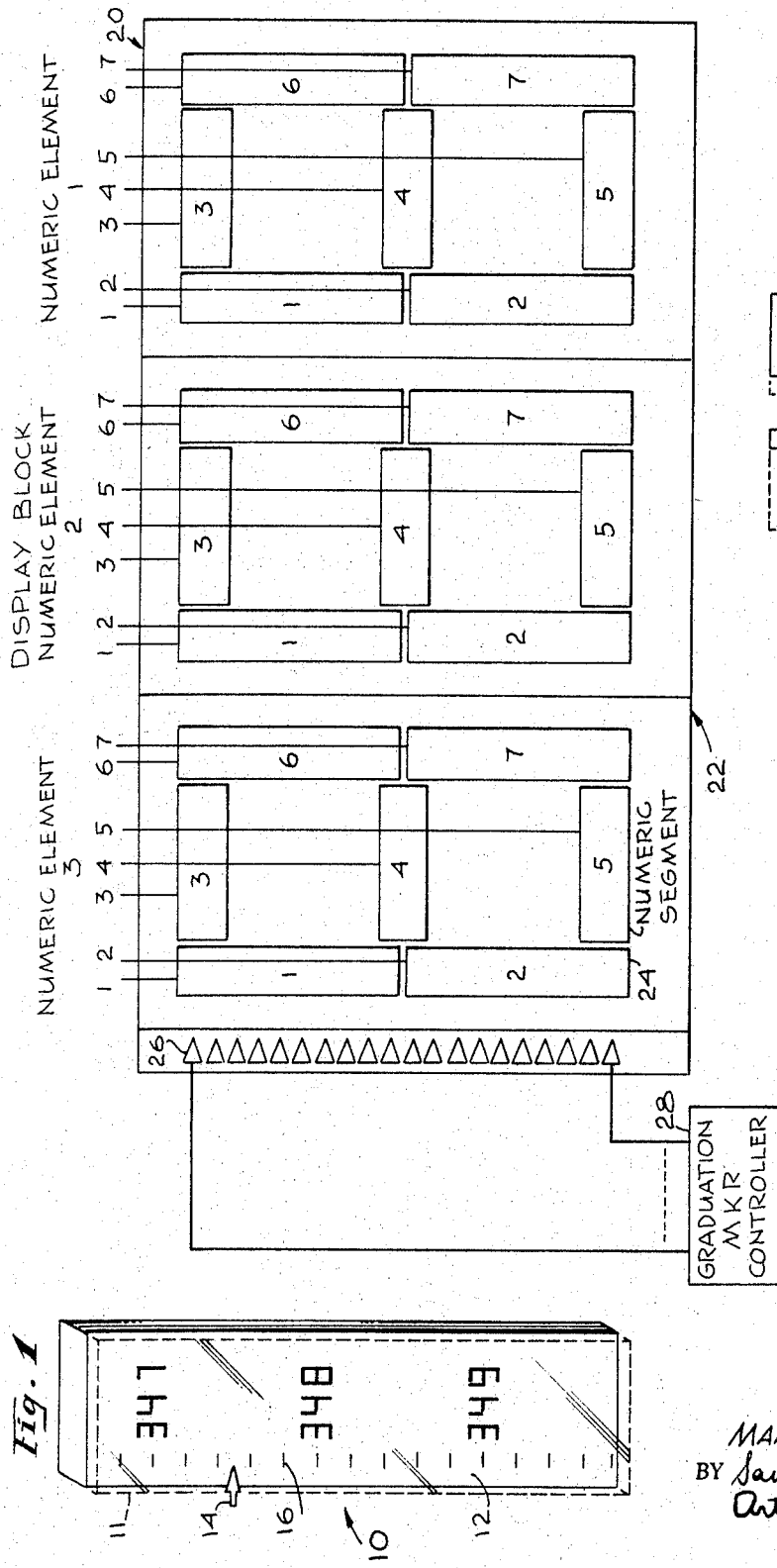
INVENTOR.
MARCEL A. PAHLAVAN
BY Samuel Lindenberg
Arthur Freilich
ATTORNEYS

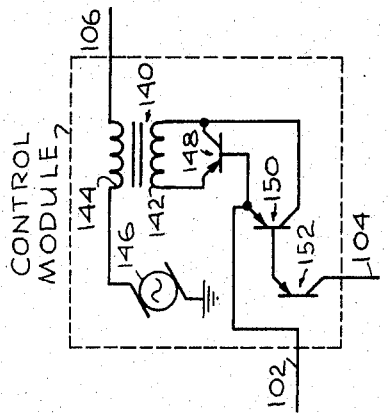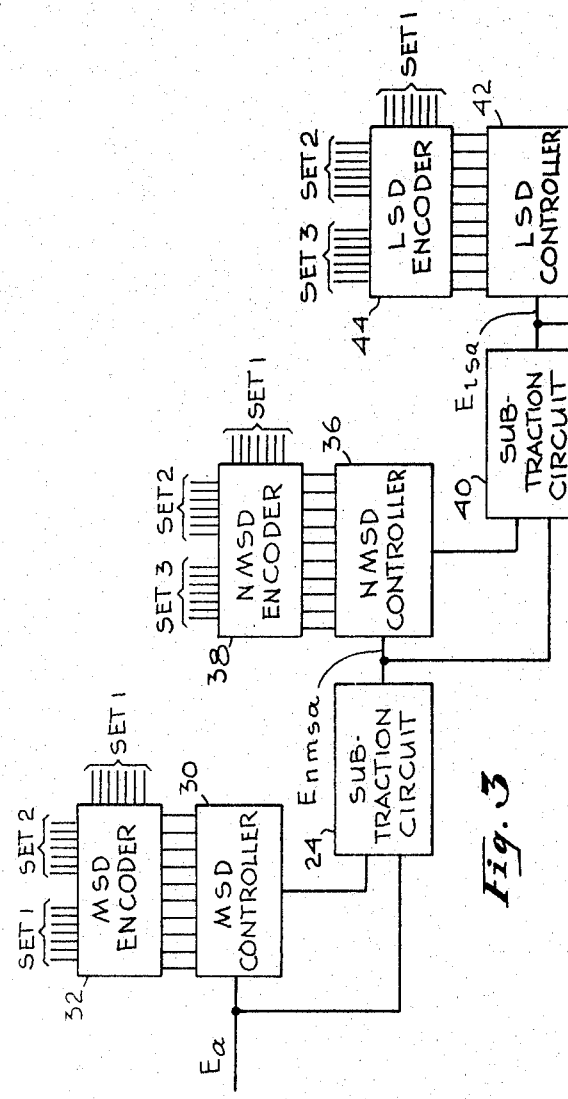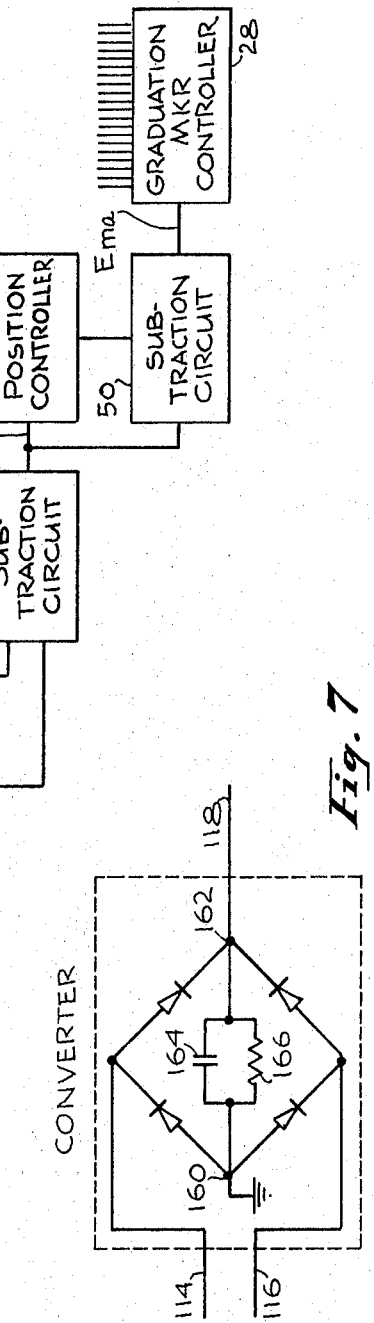

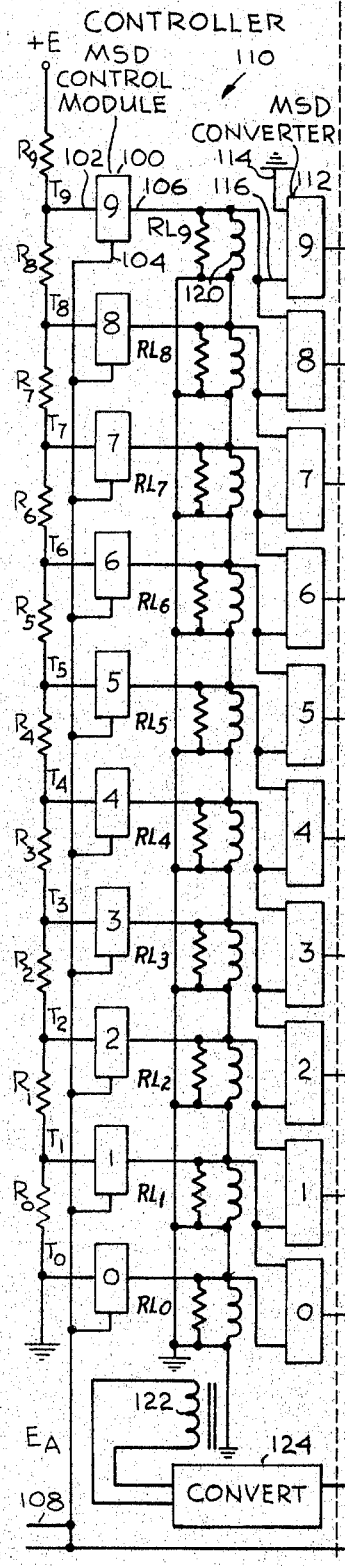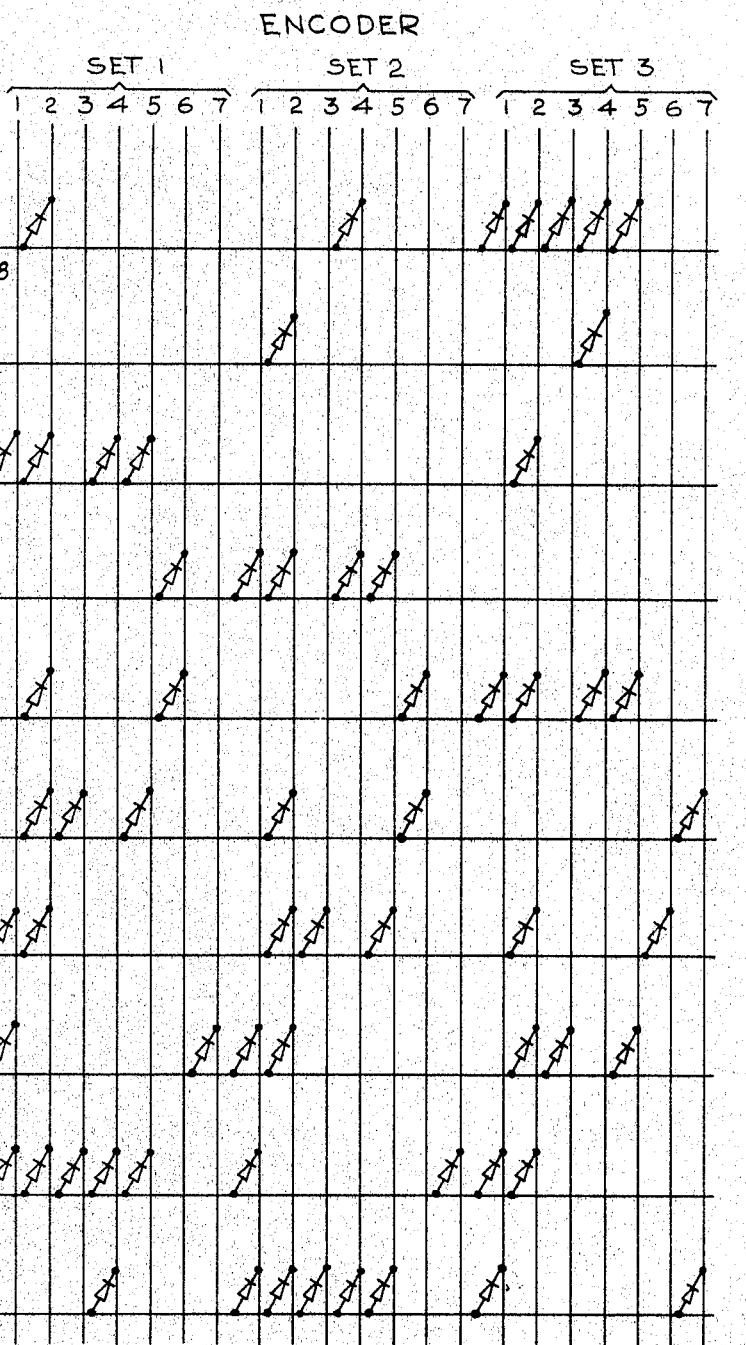

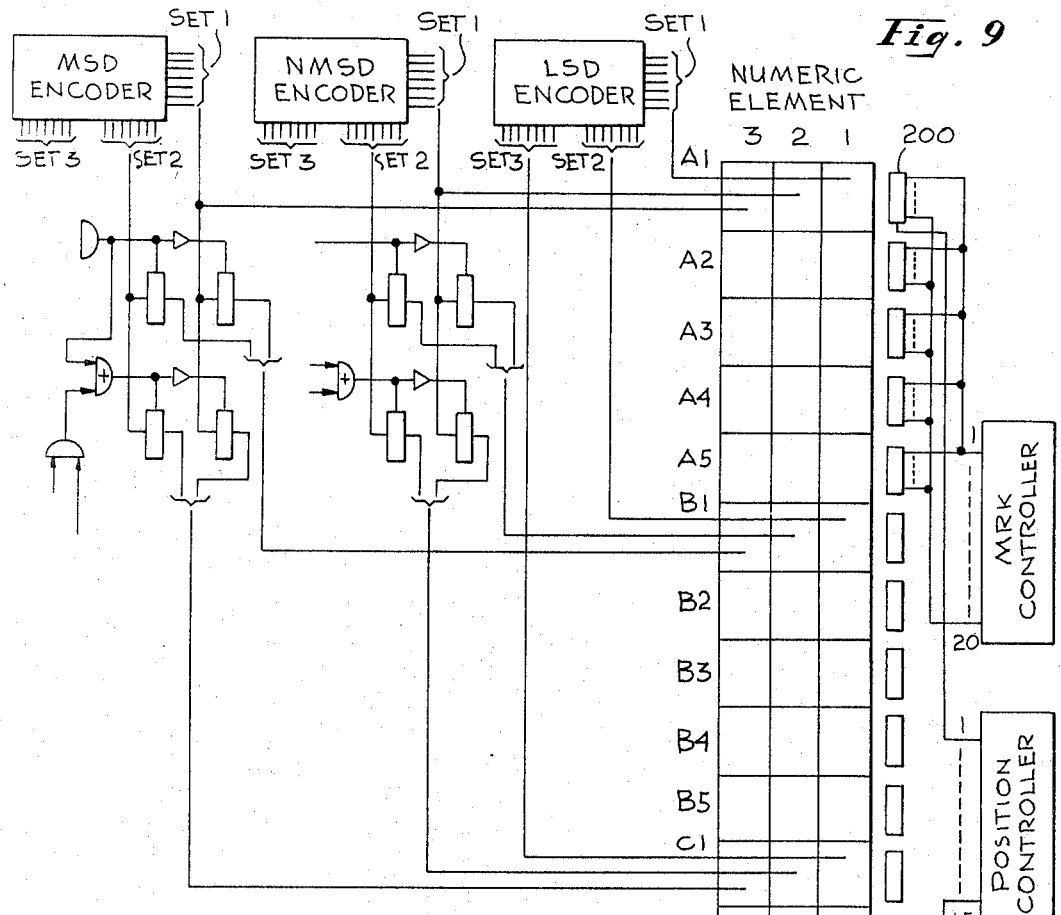
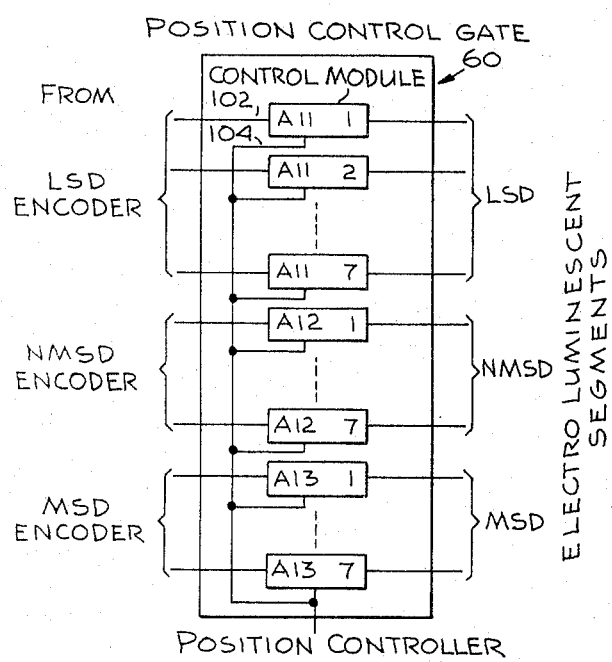
Fig. 9
Fig. 8
INVENTOR.
MARCEL A. PAHLAVAN

United States Patent Office 3,343,155
Patented Sept. 19, 1967

3,343,155
DISPLAY APPARATUS
Marcel A. Pahlavan, 11332 Berwick St.,
Los Angeles, Calif. 90049
Filed Jan. 6, 1964, Ser. No. 335,726
18 Claims. (Cl. 340—324)

ABSTRACT OF THE DISCLOSURE

A solid state display apparatus of the type useful in measuring instruments, for example, for displaying a scale whose range is based on the magnitude of the measured variable. Relative movement between the displayed scale and a reference marker can be simulated. The apparatus utilizes a plurality of numeric display elements, each element including a plurality of illuminable (e.g. electroluminescent) segments which can be selectively elluminated to define any desired digit. By closely positioning two or more elements in horizontal alignment, display blocks are formed which are capable of representing multidigit numbers. A plurality of such blocks can be closely positioned so that proper energization of the various electroluminescent segments enables the generation of an observable scale whose movement can be simulated.

---

This invention relates to visual indicating means of the type useful in measuring instruments and data processing equipment.

Conventional measuring instruments, e.g. a typical volt meter, are characterized by the use of a movable pointer which moves a distance, relative to a fixed scale, proportional to the voltage being measured to thereby visually indicate to an observer the quantitative magnitude of the measured variable. Although the provision of this type of visual indication is generally inexpensive and very satisfactory for the measurement of a large class of variables in many different environments, it has been found to be less than satisfactory in some more demanding environments. For example, in the larger and faster aircraft being used today where a pilot must be able to very rapidly scan a plurality of instruments, it has been found more efficient to provide a scale which moves relative to a fixed pointer or reference marker. If the reference markers on a plurality of instruments are in alignment, the pilot can more rapidly scan the instruments. Thus, most of the more sophisticated instruments used today in aircraft, ships, industrial control and other fields are of the moving scale type. As a rule the scale is scribed on a tape or disc edge which is moved relative to the reference marker. Because at any one time, only a small portion of the total scale need be displayed to an observer with the remaining portion of the scale being concealed, a much larger total scale can be conveniently used than with fixed scale instruments. Consequently, greater resolution is usually provided by moving scale instruments.

Although moving scale instruments are therefore often preferred, they usually are more expensive than fixed scale instruments of comparable reliability inasmuch as the mechanism required to precisely move a tape or disc is generally more costly than that required to move a pointer.

In view of the above, it is an object of this invention to provide a more reliable visual indicating means for instruments of the moving scale type.

It is a more particular object of this invention to provide a solid state device which almost perfectly simulates moving scale type indicating means and yet which requires no moving parts.

More broadly, it is an object of this invention to provide visual indicating means in which relative motion between a scale and a reference marker is simulated without any actual physical movement.

Briefly, the invention herein is directed to visual indicating means utilizing a plurality of numeric display elements, each element including a plurality of illuminable segments which can be selectively illuminated to define any desired digit, e.g. any decimal digit. By closely positioning two or more elements in horizontal alignments, display blocks are formed which are capable of representing multidigit numbers. A plurality of display blocks can be closely positioned in vertical alignment so that proper energization of the various electroluminescent segments enables the generation of an observable scale. More particularly, by displaying a range low limit multidigit number in a first display block and a range high limit multidigit number in a second block, the physical distance between the first and second blocks constitutes a scale corresponding to the range of numbers between the displayed low and high limit numbers. By moving the displayed numbers from one block to another in accordance with the magnitude of the measured quantity, physical scale movement can be almost perfectly simulated.

An alternative to simulating scale movement is disclosed in a second embodiment of the invention in which a reference marker is moved relative to the scale presentation. In either embodiment of the invention, inasmuch as the displayed numbers are not actually scribed but rather are generated in accordance with the value of the measured quantity, an exceedingly large total scale range can conveniently and inexpensively be made available.

Certain features of the invention are particularly noteworthy and consequently are mentioned at this point. Initially, each embodiment of the invention can be provided at a relatively low cost as a result of utilizing a circuit design which employs a minimum number of different circuits. Essentially, only two different basic circuits, a control module and a converter, are used in the circuit design. Inasmuch as great numbers of these two different circuits are repeatedly used throughout the design, significant fabrication and checkout economies can be realized.

A second feature of particular significance incorporated in the first embodiment of the invention is the provision of a plurality of illuminable graduation markers in each display block. The illusion of fine scale movement is simulated by properly illuminating the graduation markers to effectively change the relative position between the displayed numbers and the reference marker.

A third significant feature of the invention involves the means utilized to couple an analog input signal whose magnitude represents the magnitude of the measured quantity, to the electroluminescent segments so that minute variations in the analog signal immediately and automatically modify the visual display.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is an external perspective view of an instrument employing visual indicating means in accordance with the invention;

FIGURE 2(a) is a schematic illustration of a display block constructed in accordance with the present invention;

FIGURE 2(b) is a schematic illustration showing which electrolumiescent segments need be energized to define exemplary decimal digits;

FIGURE 3 is a block diagram illustrating various controllers responsive to an analog input signal for developing signals for controlling the generation of digits, the positioning of numbers, and the energization of graduation markers;

FIGURE 5(a) is a schematic block diagram of a typical digit controller;

FIGURE 5(b) is a circuit diagram of an encoding network for coupling each of the digit controllers through position control gates to the display blocks;

FIGURE 6 is a circuit diagram of a typical control module used in each controller;

FIGURE 7 is a circuit diagram illustrating a typical converter used in each controller;

FIGURE 8 is a block diagram of a typical position control gate; and

FIGURE 9 is a block schematic diagram of a second embodiment of the invention in which a reference marker is moved relative to a generated scale which is fixed in position.

Figure 4:
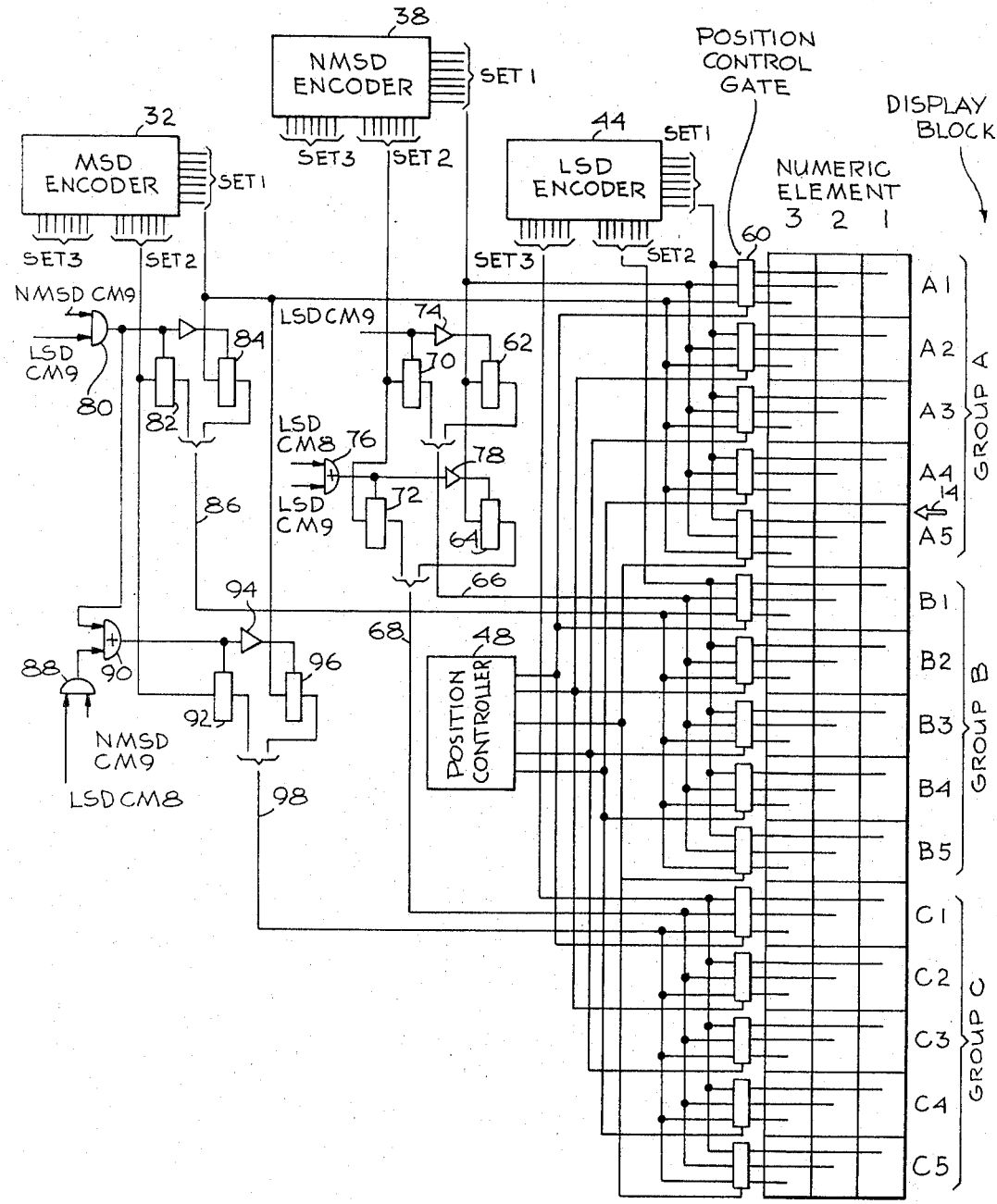
FIGURE 4 is a block schematic diagram illustrating the means coupling the controller and encoder apparatus of FIGURE 3 to the various display blocks of the indicator of FIGURE 1.

Attention is now called to FIGURE 1 which illustrates a perspective external view of a measuring instrument 10 having either a conventional moving scale indicator means or simulated moving scale indicator means in accordance with the invention. A window 11 is provided on the front face of the instrument. A means 12 for displaying numbers is positioned behind the window and is adapted to move successive numbers into view in response to an increase or decrease in the value of the quantity measured by the instrument. It will be assumed that three multidigit numbers always appear in the window. Thus, in FIGURE 1 an upper number 347 is displayed, a middle number 348 is displayed, and a lower number 349 is displayed. The number 348 is spaced from the upper and lower numbers by equal distances.

A fixed reference marker 14 is positioned adjacent the window 11 for purposes of designating a reading point on a range defined between the numbers 347 and 349. In moving scale type indicators, the means 12 for displaying the numbers is moved in response to variations in the measured quantity to align the value of the measured quantity with the reference marker 14. Conventional moving scale type indicators utilize a physically movable surface, such as a tape or a disc edge for displaying the numbers. That is, each of a whole series of numbers, e.g. 000 to 999 can be scribed on the movable surface and means responsive to the value of the measured quantity cause the appropriate portion of the surface to move into view behind the window 11. Associated with each of the numbers displayed by the means 12 is a graduation marker 16 which identifies the precise position of the number.

As pointed out in the introduction to the specification, the invention herein is directed toward the provision of solid state means for simulating the physical movement present in conventional moving scale indicators. In accordance with the invention, the display function is performed by selectively illuminating appropriately arranged electroluminescent means instead of causing a pertinent portion of a scribed scale to be moved into view. The indicator in accordance with the invention is comprised of a plurality of identical display blocks 20, a typical block being illustrated in FIGURE 2(a). Each display block includes a plurality of numeric elements 22, each numeric element being capable of displaying any decimal digit. The embodiment of the invention illustrated herein is directed to an indicator which functions over a range 000 to 999 and consequently three numeric elements are provided in each display block. It of course should be apparent that a display block could utilize as many elements as desired. Moreover, it should also be apparent that it is not essential each numeric element be capable of defining only decimal digits. Indicators in accordance with the invention can of course be provided which display digits in any desired number.

Each numeric element 22 has seven numeric segments 24 positioned therein and arranged as indicated. A separate conductor is connected to each of the numeric segments 24 and consequently permits each of the segments to be individually energized to enable any digit to be represented. By way of example, FIGURE 2(b) illustrates the numeric segments which must be illuminated to identify the decimal digits "1" and "2." Each of the numeric segments has been given a different arbitrary number and thus it can be seen that when segments 6 and 7 only are generated, the decimal digit "1" is displayed and when elements 3, 6, 4, 2, and 5 are energized, the decimal digit "2" is displayed. The following table summarizes the states of the various segments necessary to define each decimal digit.

TABLE I

| Digit | Numeric Segments | |
|---|---|---|
| | On | Off |
| 1 | 6, 7 | 1, 2, 3, 4, 5 |
| 2 | 2, 3, 4, 5, 6 | 1, 7 |
| 3 | 3, 4, 5, 6, 7 | 1, 2 |
| 4 | 1, 4, 6, 7 | 2, 3, 5 |
| 5 | 1, 3, 4, 5, 7 | 2, 6 |
| 6 | 1, 2, 3, 4, 5, 7 | 6 |
| 7 | 3, 6, 7 | 1, 2, 4, 5 |
| 8 | 1, 2, 3, 4, 5, 6, 7 | |
| 9 | 1, 3, 4, 5, 6, 7 | 2 |
| 0 | 1, 2, 3, 5, 6, 7 | 4 |

In addition to the plurality of numeric elements contained in each display block, each block includes a plurality, arbitrarily chosen herein to be twenty, of graduation marker electroluminescent segments 26. A graduation marker controller 28 which will be more specifically described hereinafter, has twenty different output terminals each of which is connected to a different one of the graduation marker segments 26. As will be seen, only one of the graduation marker segments is energized at any one time and it serves the same function as graduation marker 16 in FIGURE 1, i.e. to precisely define the position of the number represented by the numeric elements in the same display block.

In order to form an indicator simulating that shown in FIGURE 1, a plurality of display blocks, arbitrarily herein assumed to be fifteen, are closely positioned in vertical alignment as shown in FIGURE 4. The fifteen display blocks are separated into three groups, identified as group A, group B, and group C for the purpose of displaying three distinct numbers as is displayed by the indicator of FIGURE 1. The five display blocks in each group are numbered consecutively from one to five starting with the uppermost block in each group. The leftmost numeric element in each display block is identified as numeric element 3 and is utilized to display the most significant digit in each display block. Numeric element 2 is utilized to display the next most significant digit and numeric element 1 is of course utilized to display the least significant digit.

Attention is now called to FIGURE 3 which illustrates in block form the apparatus responsive to an analog voltage signal representative of the magnitude of a measured quantity for displaying the appropriate range of numbers in the display blocks and for moving that range to align the position in the range representative of the value of the measured quantity into alignment with the reference marker 14. The analog voltage signal $E_a$ is initially applied to a most significant digit controller 30 which is provided with ten output terminals, each corresponding to a different decimal digit. In response to the application of the signal $E_a$, the controller 30 energizes the one of its output terminals corresponding to the largest decimal digit which corresponds to a value smaller than that represented by the analog signal. Thus, assuming that the analog input signal represents a quantity between the numbers 347 and 349, the most significant digit controller 30 will energize its output terminal representing decimal digit 3. The ten output terminals of the controller 30 are connected to the input of a most significant digit encoder 32. The encoder 32 is provided with three sets of output terminals, each set including seven output terminals. The seven output terminals in each encoder set are utilized to energize the seven numeric segments in appropriate numeric elements. Thus, in response to the unique identification of the digit 3 output terminal of the controller 30, encoder output terminals 3, 4, 5, 6, and 7 of set 1 are energized to illuminate segments 3, 4, 5, 6, and 7. Alternatively, and for reasons that will become more apparent hereinafter, encoder output terminals 1 and 2 of set 1 can be energized to in turn inhibit the energization of segments 1 and 2. Encoder output terminal sets 2 and 3 respectively define digits 1 and 2 units larger than the digit defined by output terminal set 1. Thus, if the code representing digit 3 appears on encoder output terminal set 1, a code representing a digit 4 appears on encoder output terminal set 2 and a code representing digit 5 appears on encoder output terminal set 3.

A voltage signal corresponding in value to the digit identified by the most significant digit controller 30 is applied to a subtraction circuit 34 along with the original analog signal $E_a$. Subtraction circuit 34 develops an analog voltage signal $E_{nmsa}$ which is utilized to develop the next most significant digit to be displayed in numeric element 2 of the selected display blocks. The output of the subtraction circuit 34 is connected to the input of a next most significant digit controller 36 which can be physically identical to the controller 30. Similarly, an encoder 38, physically identical to the encoder 32 is connected to the output of the controller 36 and serves to provide an encoded signal representing digit 4, in accordance with the range of numbers assumed in FIGURE 1, on the encoder output terminal set 1. Controller 36 develops an analog signal which is subtracted from the signal $E_{nmsa}$ in the circuit 36 to provide a signal $E_{lsa}$ to a controller controlling the display of the least significant digit. Controller 42 is also physically identical to controller 30 and is connected to an encoder 44 which is physically identical to encoder 32. The least significant digit controller 42 provides an analog signal which is subtracted from the signal $E_{lsa}$ in subtraction circuit 46 to develop an analog signal $E_{pca}$ which is coupled to a position controller 48. The position controller 48 is provided with five output terminals, as illustrated, which, as will be seen hereinafter, are utilized to determine the display block in each group of display blocks in which the digits generated by the controllers 30, 36, and 42 are to be displayed. The position controller 48 develops an analog signal which is subtracted from the signal $E_{pca}$ in circuit 50 to develop an analog signal $E_{ma}$ which is applied to the previously mentioned graduation marker controller 28. As previously noted, the graduation marker controller 28 has twenty output terminals each of which is connected to a different one of the graduation marker segments 26 shown in FIGURE 2(a). The position controller 48 and graduation marker controller 28 are physically identical to the digit controllers 30, 36, and 42 except for the fact that they respectively include a fewer and greater number of stages, as will be better understood hereinafter.

FIGURE 4 is a block diagram illustrating the means coupling the encoders 32, 38, and 44 to the indicator comprised of the groups of display blocks. Associated with each display block is a position control gate 60. Each position control gate 60 will be identified in terms of the display block with which it is associated. Thus, position control gate A1 shall be understood as referring to the gate whose output is coupled to the numeric elements of the first display block in group A.

Each position control gate 60 is provided with three sets of input terminals, each set including seven input terminals. Additionally, each position control gate is provided with three sets of output terminals, each set including seven output terminals. The first, second, and third sets of input terminals to each position control gate are respectively connected to output terminals derived from the least significant digit encoder 44, the next most significant digit encoder 38, and the most significant digit encoder 32. The first, second, and third sets of output terminal of each position control gate 60 are respectively connected to the segments of the first, second and third numeric elements in the display block with which the position control gate is associated.

Each position control gate is provided with a control input terminal. The position control gates in the same group are each connected to a different output terminal of the position controller 48. Thus, position control gate A1 is connected to the first position controller output terminal, and position control gates A2 through A5 are respectively connected to the second through fifth output terminals of the position controller 48. Similarly, each of the five position control gates in group B is connected to a different position controller output terminal and each of the five position control gates in group C is connected to a different position controller output terminal.

Output terminal set 1 of the least significant digit encoder 44 is connected to the input of all of the group A position control gates. Output terminal set 2 of the encoder 44 is connected to the input of all of the group B position control gates and output terminal set 3 of the encoder 44 is connected to the input of all of the group C position control gates. It will be recalled that the code generated on the set 1 output terminal of the least significant digit encoder is determined by controller 42 and that the codes generated on set 2 and set 3 output terminals are respectively 1 and 2 units greater than the code generated on the set 1 output terminals. Consequently, whatever digit is displayed in the least significant digit position of the group A display blocks, e.g. 7 in the illustration of FIGURE 1, progressively larger digits will be displayed in groups B and C, i.e. 8 and 9. Thus, it can be seen that with the assumed scale, a different digit will be displayed in the least significant digit position of each of the groups of display blocks. On the other hand, in the next most significant digit and most significant digit numeric elements, the same digits can be displayed in different blocks. The group A display blocks will always display the digit represented by the code provided on the set 1 output terminals of the encoders 38 and 32. The next most significant digit and most significant digit numeric elements in group B and C will either display the same digit as that displayed in the corresponding positions in group A or will display a digit one unit greater as would be provided on output terminal set 2 of the encoders 38 and 32. Thus, output terminal set 1 of encoder 38 is connected to the input terminals of gates 62 and 64 which are physically similar to the position control gates 60. The output of gate 60 is connected to conductor 66 which is connected to the input of all of the group B position control gates. The output of gate 64 is coupled to conductor 68 which is connected to the input of all the group C position control gates. The set 2 output terminals of encoder 38 are connected to the input of gates 70 and 72 whose output terminals are respectively connected to the conductors 66 and 68.

It should be apparent that the next most significant digit numeric element in group B should display the same digit as that displayed in group A except when a "9" digit is displayed by the least significant digit numeric element of group A. Thus, by connecting a conductor from the least significant digit control module 9 (to be discussed hereinafter), directly to the control input terminal of gate 70 and through an inverter 74 to the control input terminal of gate 62, gate 62 will be enabled and gate 70 will be disabled so long as anything but a "9" digit is displayed by the least significant digit numeric element of group A. When a "9" digit is displayed by a group A least significant digit numeric element, then gate 70 will be enabled and gate 62 will be disabled.

The group C next most significant digit numeric element should diplay the same digit as that displayed in the next most significant digit numeric element of group A unless a "9" or an "8" digit is displayed by a least significant digit numeric element of group A. Thus, the output terminals of the least significant digit control modules 9 and 8 are connected to the input of an Or gate 76 whose output is connected directly to the control input terminal of gate 72 and through an inverter 78 to the control input terminal of a gate 64. Thus, the next most significant digit numeric element of group C will display the same digit as that displayed by the next most significant digit numeric element of group A except when a "9" or "8" digit is displayed by the least significant digit numeric element of group A, and then it will instead display the digit provided by output terminal set 2 of encoder 38.

With respect to the most significant digit to be displayed by a group B numeric element, it should be the same as that displayed in group A except when both the next most significant digit and the least significant digit numeric elements of group A display "9's." When this occurs, And gate 80 will enable gate 82 and disable gate 84. Output terminal sets 2 and 1 are respectively connected to the input terminals of gates 82 and 84 whose output terminals are both coupled to conductor 86 which is connected to the input of each of the group B position control gates.

When a "9" digit is displayed by the next most significant digit numeric element of group A, and either a "9" or an "8" digit is displayed by the group A least significant digit numeric element, output terminal set 2 of encoder 32 should be coupled to the most significant digit numeric elements of group C. At all other times output terminal set 1 of encoder 32 can be coupled to the most significant digit numeric elements of group C. In order to implement these conditions, And gate 88 is provided which functions to provide a true signal whenever the next most significant digit numeric element of group A displays a "9" and the least significant digit numeric element of group A displays an "8." The output of both gates 80 and 88 are connected to the input of Or gate 90. The output of Or gate 90 is connected directly to the control input terminal of gate 92 and through an inverter 94 to the control input terminal of gate 96. Output terminal sets 1 and 2 of encoder 32 are respectively connected to the inputs of gates 96 and 92. The output terminals of gates 96 and 92 are connected to conductor 98 which is connected to all of the group C position control gates.

Thus far, it should be understood that in response to an analog signal $E_a$ developed to represent the magnitude of a measured quantity, a range low limit number will be displayed in the group A display blocks with numbers respectively 1 and 2 units greater being displayed in the group B and group C display blocks. The position in the group of display blocks in which the three numbers are respectively displayed is determined by the particular energized output terminal of the position controller 48. The precise position of each number in its display block is designated by the illuminated graduation marker controlled by the graduation marker controller 28.

Attention is now called to FIGURE 5(a) which illustrates a block diagram of a digit controller apparatus, i.e. either the controller 30, 36, or 42. It is also again pointed out that the position controller 48 and graduation marker controller 28 are each identical to the digit controllers except that they respectively have a fewer and greater number of stages. The controller of FIGURE 5(a), which it will be assumed is the most significant digit controller 30, includes ten control modules 100, each corresponding to a different decimal digit. Each of the control modules is provided with a pair of input terminals 102 and 104 and an output terminal 106. The details of the control module will be considered subsequently but suffice it to say at this point that each control module is responsive to a predetermined voltage difference appearing across the terminals 102 and 104 to provide an alternating current voltage output signal on terminal 106.

Terminal 104 of each of control modules 100 is connected to the controller input terminal 108. Thus, assuming that the controller of FIGURE 5(a) is the most significant digit controller, the analog signal $E_a$ representative of the measured quantity is applied to the terminal 104 of all of the control modules 100. A voltage divider network 110 is connected between first and second sources of reference potential, $+E$ and ground. The voltage divider 110 compirses a series string of resistances $R_0$ through $R_9$. Taps $T_0$ through $T_9$ are respectively connected to the lower end of each of resistances $R_0$ through $R_9$. Each tap $T_0$ through $T_9$ is respectively connected to the input terminal 102 of a different one of the control modules 100. Thus, a small analog voltage signal applied to input terminal 108 may be insufficient to cause any of the control modules 100 to apply an alternating current signal to its output terminal 106. However, as the voltage $E_a$ increases, it will successively exceed the test voltages appearing on taps $T_0$, $T_1$, $T_2$, etc. and consequently successively cause the control module 0, control module 1, control module 2, etc. to apply an alternating current signal to its terminal 106. On the other hand, assuming that the voltage $E_a$ then decreases, control module 2, control module 1, control module 0, will successively stop applying the alternating output signal to output terminals 106.

Load resistors RL0 through RL9 are respectively connected between an output terminal 106 of a different one of the control modules and ground. In operation, again assuming that the signal $E_a$ has a value as represented by the numbers illustrated in FIGURE 1, control module 3 will be energized to cause an alternating current output signal to be developed in load resistor RL3 but control module 4 will not be energized and consequently no voltage drop will appear across load resistor RL4. In order to detect the highest valued control module which is energized and in order to convert the alternating voltage signals appearing across the load resistors into direct current signals for encoding purposes, ten converters 112 are provided. Each of the converters 112 has a pair of input terminals 114 and 116 and a single output terminal 118. Each converter input terminal 114 is connected to the output terminal 106 of the immediately higher valued control module 100 while each of the converter input terminals 116 is conected to the output terminal 106 of the corresponding control module. Thus, terminal 114 of converter 8 is connected to output terminal 106 of control module 9 and terminal 116 of converter 8 is connected to terminal 106 of control module 8. Terminal 114 of converter 9 is connected to ground.

Again assume that control modules 0, 1, 2, and 3 are energized and consequently provide alternating current signals across their load resistors while the rest of the control modules remain deenergized. As a result, a voltage difference will appear only at the input terminals 114 and 116 of the converter 112 associated with the highest valued energized control module. That is, no voltage difference will appear across the input terminals of converters 0, 1, or 2 because they will be connected between terminals 106 on which appears alternating current signals having the same magnitude and frequency and phase relationships. Likewise with respect to converters 4 through 9, no signals will be presented across the input terminals thereto inasmuch as the output terminals 106 of the control modules to which they are connected will all be dormant. An alternating current signal will however appear across the terminals 114 and 116 of converter 3 and as a consequence converter 3 will provide a direct current output signal on its output terminal 118. Thus, it has been indicated how the idgit controller responds to an analog input signal for uniquely identifying one of its ten output terminals which corresponds to a digit whose effective magnitude is just below that represented by the analog signal. The output terminals of the converters 112 comprise the output terminals of the controller and are coupled to an encoder, as illustrated in FIGURE 5(b).

Prior to considering the details of the encoder, the means by which a difference voltage signal can be developed for application to the next most significant digit controller will be considered. The difference signal can be developed by initially developing a voltage signal proportional to the uniquely identified controller output terminal. In order to do this, a different transformer primary winding 120 is connected across each of the load resistors RL0 through RL9. The windings 120 are connected in series so that if the analog input signal, as has been assumed, is sufficient to energize control module 3, then alternating current voltages will appear across load resistors RL0 through RL3. The voltages applied to the primary windings 120 are additive in nature so that the transformer secondary winding 122 wound on the same core as the windings 120, will see a voltage which is proportional to the number of control modules energized. The terminals of the secondary winding 122 are applied across the input terminals of a converter 124 which can be physically similar to the converters 112, to develop a direct current voltage which is applied to the input terminal of the previously mentioned subtract circuit 34. The analog signal $E_a$ is applied to a second input terminal of the subtract circuit 34. The subtract circuit 34 functions to develop a difference voltage which is utilized to develop the next most significant digit.

The construction of the next most significant digit controller and least significant controller are identical to the most significant digit controller insulated in FIGURE 5(a). The input signal applied to the next most significant digit controller and least significant digit controllers are however derived from subtract circuits 34 and 40 rather than being the analog signal $E_a$ representative of the measured quantity. The position controller 48 and graduation marker controller 28 are also identical to the digit controllers except however that position controller 48 requires only five stages in lieu of the ten stages required by the digit controllers. The graduation marker controller requires 20 stages.

FIGURE 5(b) illustrates a diode encoder matrix which can comprise either the encoder 32, 38, or 44 of FIGURE 3. As should be apparent, the function of the encoder is to respond to the uniquely identified output terminal of the controller to provide a seven bit code each bit being used to control a different numeric segment. It has been previously indicated and it should be apparent from Table I that the number of diodes required in the encoder matrix of FIGURE 5(b) can be minimized by energizing encoder output terminals to maintain selected numeric segments off rather than to cause their illumination. Thus, as an example the output terminal 118 of converter 9 in FIGURE 5(a) is connected through a diode to output terminal 2 of the encoder output terminal set 1. This means that when the converter 9 applies a direct current signal to its output terminal 118, all the numeric segments other than segment 2 of the numeric element connected to the encoder output terminal set 1 will be illuminated to thereby define the decimal digit 9 as illustrated in FIGURE 2(b). A diode also connects output terminal 118 of converter 9 to output terminal 4 of encoder output terminal set 2. As can be seen from Table I, this connection prohibits the illumination of segment 4 which enables output terminal set 2 to define a "0" digit, which of course is one unit greater than a "9" digit. Similarly, output terminal set 3 coupled to output terminal 118 of converter 9 has diodes which prevent the illumination of segments 1, 2, 3, 4, and 5 to thereby define a digit "1." Thus, it should be apparent that output terminal sets 1, 2, and 3 of the encoder respond to a direct current signal provided by any one of the converters for providing a coded signal in set 1 which causes the numeric segments of a connected numeric element to define the decimal digit corresponding to the particular converter, and the output terminal sets 2 and 3 to provide coded signals representing decimal digits one and two units greater than that represented by the coded signals provided by set 1.

FIGURE 6 illustrates the details of a typical control module. The control module forms the subject matter of U.S. application Ser. No. 156,350, filed Dec. 1, 1961, entitled, "Control Circuit." Briefly, the control module includes a transformer 140 having a secondary winding 142 and a primary winding 144. The primary winding 144 is connected in series between an alternating current signal source 146 and terminal 106. The secondary winding 142 is connected between the emitter and collector of a PNP transistor 148. The base and collector of transistor 148 are respectively connected to the emitter and collector of transistor 150. The base of transistor 150 is connected to the collector of transistor 152 which functions in the circuit as a leaky diode. The emitter and collector of transistors 150 and 152 respectively comprise the control module input terminals 102 and 104.

In the operation of the control module, in the absence of a sufficient forward biasing voltage applied across terminals 102 and 104, transistor 148 is non-conductive, and as a result the impedance of the primary winding 144 is high. Therefore, the energy delivered out of terminal 106 is extremely low. Upon the application of a control signal across terminals 102 and 104, current on the order of a few microamperes flows through transistor 152, which current is amplified by transistor 150. This current is applied to transistor 148 and is sufficient to render it conductive in saturation. As a result, an effective short circuit is connected across the transformer secondary winding 142 permitting a large current to flow therein so that the primary winding 144 presents a low impedance between terminal 106 and the source 146.

FIGURE 7 illustrates a typical converter circuit and comprises a full wave rectifier diode bridge circuit. The input to the bridge is derived from previously mentioned input terminals 114 and 116. The diodes act to rectify the alternating current signal applied across the terminals 114 and 116. The bridge circuit output terminals 160 and 162 are respectively connected to ground and to the converter output terminal 118. A parallel circuit consisting of a capacitor 164 and a resistor 166 are connected across the terminals 160 and 162 and function to integrate or smooth the full wave rectifier signal applied to terminal 118.

Attention is now called to FIGURE 8 which illustrates a block diagram of one of the position control gates 60 of FIGURE 4. It will be recalled that each of the position control gates receives coded signals from one set of output terminals from each of the digit encoders 32, 38, and 44 and that each of the position control gates is enabled by an output terminal of the position controller 48. The gate 60 employs a hypical control module for each of the twenty-one lines controlled by the gate. Seven control modules, respectively identified as A111 through A117, are dedicated to least significant digit information. Similarly, seven control modules A121 through A127 are provided to couple the coded signals representing the next most significant digit from encoder 38 to numeric element 2 of display block A1. Likewise, control modules A131 through A137 are provided to couple the most significant digit information.

Each of the set 1 output terminals of the least significant digit encoder 44 is connected to the input terminal 102 of a different one of the control modules A111 through A117. Each of the set 1 output terminals of the next most significant digit encoder 38 is connected to the input terminal 102 of a different one of the control modules A121 through A127 and each of the set 1 output terminals of the most significant digit encoder 32 is connected to the input terminal 102 of a different of the control modules A131 through A137. The first output terminal of the position controller 48 is connected to the control terminal of the position control gate which in turn is connected to the input terminal 104 of all of the control modules therein.

In operation, if the analog signal applied to the position controller indicates that the numbers are to be displayed in the first display block in each group of display blocks, then the position controller output terminal 1 will be provided with a direct current signal. This direct current signal will be adequate to forward bias all of the control modules in the position control gate A1 to thus illuminate all of the numeric segments in the numeric elements of display block A1. The control modules in the position control gate A1 however which have an input signal applied to the input terminal 102 thereof by virtue of their being connected through the diodes of the encoder of FIGURE 5(b), will be prevented from being energized so that the numeric segment connected thereto will not be illuminated.

From the foregoing, it should be appreciated that a solid state apparatus has been provided herein which enables a range of numbers to be displayed in accordance with an analog signal representative of the magnitude of a measured quantity and in addition to enable that range to be automatically aligned with respect to a reference marker for enabling the value of the measured quantity to be read. Moreover, it should be apparent that variations in the analog voltage resulting from variations in the measured quantity, will cause the displayed numbers to appear to shift in first and second directions responsive to increases and decreases in the measured quantity. Thus, without utilizing any physically moving elements, a moving scale indicator can be nearly perfectly simulated. Thus, while retaining the inherent convenience of moving scale type indicators, increased reliability and resolution is achieved. It is additionally again pointed out that resolution is increased even further by the utilization of the illuminable graduation markers which are employed in each display block for precisely defining the position of each displayed number. Thus, it should be clear that in response to very fine variations in the magnitude of the measured quantity, the graduation marker will appear to shift while in response to moderate variations in the measured quantity, each displayed number will shift from one display block to another within the same group. In response to greater variations in the magnitude of the measured quantity, the displayed numbers will change.

FIGURE 9 illustrates an alternative arrangement which employs the same general concepts and substantially the same apparatus as has been utilized in the initial embodiment of the invention. The embodiment of FIGURE 9 differs from the first embodiment in that in lieu of simulating the movement of a scale relative to a fixed reference marker, a reference marker is moved relative to a fixed scale. In the embodiment of FIGURE 9, the digit codes are generated by the digit controllers in the same manner as in the first embodiment. However, they are not passed through the position control gates but instead are always applied to the same display block in each group of display blocks. That is, the position controller does not determine the position in which the numbers are displayed. Intsead, the position controller is provided with fifteen output terminals and utilized to control marker control gates 200. A marker controller 28, identical to that previously described, is provided with each of its twenty output terminals coupled to the input of each of the fifteen marker control gates. Thus, in response to an analog signal representative of the magnitude of a measured quantity, the digit controllers and decoders will cause a display to be presented which defines a range which includes the magnitude of the measured quantity. The position controller will enable one of the fifteen marker control gates to reference a particular display block or area within the displayed range. The output of the marker controller 28 of course indicates the precise value of the measured quantity.

Many further embodiments of the invention will no doubt become apparent to those skilled in the art. For example, heretofore not mentioned bar graphs can be easily generated by using the information provided by the position and marker controllers in FIGURE 9. Thus a solid bar positioned adjacent a displayed scale can be given a length relative to the scale which indicates the value of a measured quantity. Moreover, both moving and fixed reference markers can be used in conjunction with the same display device as where a fixed reference marker is generated to establish a scale range and indicate in that range a desired condition and a moving reference marker, as a bar graph, functions to indicate the value of a measured quantity.

Although the illuminalbe segments discussed herein have been assumed to be of the electroluminescent type, it should be understood that the teachings of the invention are readily adaptable for use with other types of illuminable segments, e.g. gas discharge devices.

What is claimed is:

1. Display means responsive to a magnitude representing signal for generating a visual display of a range of numbers which includes the magnitude represented by said signal, said display means comprising a plurality of display blocks contiguously disposed to define a display surface, each of said display blocks including a plurality of numeric elements; each of said numeric elements including a plurality of illuminable segments arranged to enable different digits to be defined by the selective illumination thereof; means responsive to said signal for selectively illuminating segments in a first of said blocks to define a range first limit number and for selectively illuminating segments in a second of said blocks to define a range second limit number; a visually observable reference marker positioned adjacent said display blocks; and means responsive to said signal for selecting said first and second blocks from said plurality of blocks whereby the range defined by said first and second limit numbers can be moved relative to said reference marker for aligning said reference marker with a position in said range corresponding to the magnitude represented by said signal.

2. Display means responsive to a magnitude representing signal for generating a visual display of a range of numbers which includes the magnitude represented by said signal, said display means comprising a plurality of display blocks contiguously disposed to define a display surface, each of said display blocks including a plurality of numeric elements; each of said numeric elements including a plurality of illuminable segments arranged to enable different digits to be defined by the selective illumination thereof; means responsive to said signal for selectively illuminating segments in a first of said blocks to define a range first limit number and for selectively illuminating segments in a second of said blocks to define a range second limit number; a plurality of selectively illuminable reference marker means in each of said display blocks; and means responsive to said signal for illuminating the one of said reference marker means aligned with a position in said displayed range of numbers corresponding to the magnitude represented by said signal.

3. Display means responsive to a magnitude representing signal for generating a visual display of a range of numbers which includes the magnitude represented by said signal, said display means comprising a plurality of display blocks contiguously disposed to define a display surface, each of said display blocks including a plurality of numeric elements; each of said numeric elements including a plurality of illuminable segments arranged to enable different digits to be defined by the selective illumination thereof; a reference marker fixed in position adjacent said display blocks; means responsive to said signal for selectively illuminating segments in one of said display blocks to define a range first limit number and for selectively illuminating segments in a second of said display blocks to define a range second limit number; and position control means responsive to changes in said signal for sequentially activating said display blocks for shifting the position of said range of numbers to cause the position in said range corresponding to the magnitude represented by said signal to be aligned with said reference marker.

4. Display means responsive to an analog signal for generating a visual display of a range of numbers which includes the magnitude represented by said analog signal, said display means comprising a plurality of display blocks contiguously disposed to define a display surface, each of said display blocks including a plurality of numeric elements; each of said numeric elements including a plurality of illuminable segments arranged to enable different decimal digits to be defined by the selective illumination thereof; means responsive to said analog voltage signal for selectively illuminating segments in a first of said blocks to define a range low limit number and for selectively illuminating segments in a second of said blocks to define a range high limit number; a visually observable reference marker positioned adjacent said display blocks; and means responsive to said signal for selecting said first and second blocks from said plurality of blocks whereby the range defined by said low and high limit numbers can be moved relative to said reference marker for aligning said reference marker with a position in said range corresponding to the magnitude represented by said analog voltage signal.

5. Display means responsive to an analog voltage signal for generating a visual display of a range of numbers which includes the magnitude represented by said analog voltage signal, said means comprising a plurality of display blocks contiguously disposed to define a display surface, each of said display blocks including a plurality of numeric elements; each of said numeric elements including a plurality of illuminable segments arranged to enable different decimal digits to be defined by the selective illumination thereof; a reference marker fixed in position adjacent said display blocks; a plurality of digit controllers each of which corresponds in significance to a different one of the plurality of numeric elements in each of said display blocks; each of said digit controllers having an input terminal and ten output terminals each representative of a different decimal digit; means in each of said digit controllers for developing a different test voltage signal corresponding to each output terminal thereof; means in each of said digit controllers for comparing a voltage signal applied to the input terminal thereof with each of said test voltage signals developed thereby; means associated with each of said digit controllers for developing a difference voltage signal, representing the difference between the voltage signal applied thereto and the largest test voltage signal developed thereby, having a value smaller than said applied voltage signal; means in each of said digit controllers for uniquely identifying the output terminal thereof corresponding to the largest test voltage signal smaller than the voltage signal applied thereto; means applying said analog voltage signal to the input terminal of the most significant digit controller and the difference voltage signal developed by each digit controller to the input terminal of the immediately less significant digit controller; encoding means coupling the uniquely identified output terminal of each digit controller to the segments of the numeric elements of corresponding significance in one of said display blocks for selectively illuminating said segments to define the decimal digits of a range low limit number represented by the uniquely identified output terminals and for selectively illuminating segments in a second of said display blocks to define a range high limit number; and position control means responsive to changes in said analog voltage signal for sequentially activating said display blocks for shifting the position of said range of numbers defined by said low and high limit numbers to cause the position in said range corresponding to the magnitude represented by said analog voltage signal to be aligned with said reference marker.

6. The display means of claim 5 wherein said plurality of display blocks are segregated into $n$ groups, each group containing the same number of display blocks and wherein said one of said display blocks is in a first of said $n$ groups and said second of said display blocks is correspondingly positioned in a second of said $n$ groups.

7. The display means of claim 5 wherein said position control means includes a position controller having an input terminal and a plurality of output terminals; a plurality of position control gates each having input and output terminals and a control terminal; means coupling said encoding means to the input terminals of all of said gates; means coupling each of said position controller output terminals to the control terminal of a different one of said gates; means coupling the output terminals of each of said gates to the segments of a different one of said blocks; means applying the difference voltage signal developed by the least significant digit controller to the input terminal of said position controller; means in said position controller for developing a different test voltage signal corresponding to each of its output terminals; means in said position controller for comparing the difference voltage signal applied thereto with each of said test voltages developed thereby to uniquely identify the output terminal thereof corresponding to the largest test voltage signal smaller than the applied difference voltage signal; and means for enabling said position control gate connected to said uniquely identified position controller output terminal for coupling said encoding means to said one of said blocks.

8. The display means of claim 7 wherein said plurality of display blocks are segregated into $n$ groups and wherein said one of said display blocks and said second of said display blocks are correspondingly positioned in different groups.

9. The display means of claim 5 wherein each of said digit controllers includes a voltage divider network connected between first and second sources of reference potential and having ten taps; ten control modules each having first and second control terminals; means connecting each first control terminal to a different one of said taps; means connecting each second control terminal to the digit controller input terminal; means connecting a different output terminal to each of said control modules; switch means in each control module actuatable in response to the same predetermined voltage difference across said first and second control terminals thereof; and means responsive to the actuated switch means in the control module connected to the tap remotest from said first source of reference potential for uniquely identifying the output terminal connected thereto.

10. The display means of claim 9 wherein said means for uniquely identifying an output terminal includes a different load connected to each of said control modules; means for energizing each of said loads in response to the actuation of the switch means connected thereto; and means for determining which energized load is connected to a control module which is connected to a tap remotest from said first source of reference potential.

11. Display means responsive to an analog voltage signal for generating a visual display of a range of numbers which includes the magnitude represented by said analog voltage signal, said means comprising a plurality of display blocks contiguously disposed to define a display surface, each of said display blocks including a plurality of numeric elements; each of said numeric elements including a plurality of illuminable segments arranged to enable different decimal digits to be defined by the selective illumination thereof; a reference marker fixed in position adjacent said display blocks; a plurality of digit controllers each of which corresponds in significance to a different one of the plurality of numeric elements in each of said display blocks; each of said digit controllers having an input terminal and ten output terminals each representative of a different decimal digit; means in each of said digit controllers for developing a different test voltage signal corresponding to each output terminal thereof; means in each of said digit controllers for comparing a voltage signal applied to the input terminal thereof with each of said test voltage signals developed thereby; means associated with each of said digit controllers for developing a different voltage signal representing the difference between the voltage signal applied thereto and the largest test voltage signal developed thereby having a value smaller than said applied voltage signal; means in each of said digit controllers for uniquely identifying the output terminal thereof corresponding to the largest test voltage signal smaller than the voltage signal applied thereto; means applying said analog voltage signal to the input terminal of the most significant digit controller and the difference voltage signal developed by each digit controller to the input terminal of the immediately less significant digit controller; encoding means coupling the uniquely identified output terminal of each digit controller to the segments of the numeric elements of corresponding significance in one of said display blocks for selectively illuminating said segments to define the decimal digits of a range low limit number represented by the uniquely identified output terminals and for selectively illuminating segments in a second of said display blocks to define a range high limit number; position control means responsive to changes in said analog voltage signal for sequentially activating said display blocks for shifting the position of said range of numbers defined by said low and high limit numbers to cause the position in said range corresponding to the magnitude represented by said analog voltage signal to be aligned with said reference marker; a plurality of selectively illuminable graduation marker segments positioned in each of said display blocks; and graduation marker control means responsive to said analog voltage signal for selectively illuminating one of said graduation marker segments in each of said display blocks.

12. The display means of claim 11 wherein said position control means includes a position controller having an input terminal and a plurality of output terminals; a plurality of position control gates each having input and output terminals and a control terminal; means coupling said encoding means to the input terminals of all of said gates; means coupling each of said position controller output terminals to the control terminal of a different one of said gates; means coupling the output terminals of each of said gates to the segments of a different one of said blocks; means applying the difference voltage signal developed by the least significant digit controller to the input terminal of said position controller; means in said position controller for developing a different test voltage signal corresponding to each of its output terminals; means in said position controller for comparing the difference voltage signal applied thereto with each of said test voltages developed thereby to uniquely identify the output terminal thereof corresponding to the largest test voltage signal smaller than the applied difference voltage signal; and means for enabling said position control gate connected to said uniquely identified position controller output terminal for coupling said encoding means to said one of said blocks.

13. The display means of claim 11 wherein said graduation marker control means includes a graduation marker controller having an input terminal and a plurality of output terminals; means coupling each of said graduation marker output terminals to a different one of said graduation marker segments; means in said position controller for developing a difference voltage signal representing the difference between the voltage signal applied thereto and the largest test voltage signal developed thereby having a value smaller than said applied voltage signal; means in said graduation marker controller for developing a different test voltage signal corresponding to each output terminal thereof; means applying said difference voltage signal developed by said position controller to the input terminal of said graduation marker controller; means in said graduation marker controller for uniquely identifying the output terminal thereof corresponding to the largest test voltage signal smaller than the voltage signal applied thereto; and means illuminating said graduation marker connected to said uniquely identified output terminal.

14. The display means of claim 11 wherein each of said controllers includes a voltage divider network connected between first and second sources of reference potential and having a plurality of taps; a plurality of control modules each having first and second control terminals; means connecting each first control terminal to a different one of said taps; means connecting each second control terminal to the digit controller input terminal; means connecting a different output terminal to each of said control modules; switch means in each control module actuatable in response to the same predetermined voltage difference across said first and second control terminals thereof; and means responsive to the actuated switch means in the control module connected to the tap remotest from said first source of reference potential for uniquely identifying the output terminal connected thereto.

15. Display means responsive to an analog voltage signal for generating a visual display of a range of numbers which includes the magnitude represented by said analog voltage signal, said means comprising a plurality of display blocks contiguously disposed to define a display surface, each of said display blocks including a plurality of numeric elements; each of said numeric elements including a plurality of illuminable segments arranged to enable different decimal digits to be defined by the selective illumination thereof; a plurality of digit controllers each of which corresponds in significance to a different one of the plurality of numeric elements in each of said display blocks; each of said digit controllers having an input terminal and ten output terminals each representative of a different decimal digit; means in each of said digit controllers for developing a different test voltage signal corresponding to each output terminal thereof; means in each of said digit controllers for comparing a voltage signal applied to the input terminal thereof with each of said test voltage signals developed thereby; means associated with each of said digit controllers for developing a difference voltage signal representing the difference between the voltage signal applied thereto and the largest test voltage signal developed thereby having a value smaller than said applied voltage signal; means in each of said digit controllers for uniquely identifying the output terminal thereof corresponding to the largest test voltage signal smaller than the voltage signal applied thereto; means applying said analog voltage signal to the input terminal of the most significant digit controller and the difference voltage signal developed by each digit controller to the input terminal of the immediately less significant digit controller; encoding means coupling the uniquely identified output terminal of each digit controller to the segments of the numeric elements of corresponding significance in one of said display blocks for selectively illuminating said segments to define the decimal digits of a range low limit number represented by the uniquely identified output terminals and for selectively illuminating segments in a second of said display blocks to define a range high limit number; a plurality of selectively illuminable reference marker means in each of said display blocks; and position control means responsive to said analog voltage signal for selectively illuminating the one of said reference marker means aligned with a position in said displayed range of numbers corresponding to the magnitude represented by said signal.

16. The display means of claim 15 wherein said position control means includes a position controller having an input terminal and a plurality of output terminals; means coupling each of said position controller output terminals to a different one of said reference marker means; means coupling the output terminals of each of said gates to the segments of a different one of said blocks; means applying the difference voltage signal developed by the least significant digit controller to the input terminal of said position controller; and means in said position controller for developing a different test voltage signal corresponding to each of its output terminals.

17. Apparatus for simulating a moving scale indicator comprising a plurality of vertically aligned display blocks, each block including a plurality of horizontally aligned numeric elements; each of said numeric elements including a plurality of selectively illuminable segments arranged to define any decimal digit; an analog voltage source; means responsive to the analog voltage provided by said source for causing a first of said display blocks to display a number less than that represented by said analog voltage and a second of said display blocks, spaced a predetermined number of blocks from said first display block, to display a number greater than that represented by said analog voltage; a fixed reference marker positioned adjacent said display blocks; and means for shifting said displayed numbers from said first and second display blocks in a first direction to third and fourth display blocks in response to an increase in magnitude of said analog signal and in a second direction to fifth and sixth display blocks in response to a decrease in magnitude of said analog signal.

18. Apparatus for simulating a moving scale indicator comprising a plurality of vertically aligned display blocks, each block including a plurality of horizontally aligned numeric elements; each of said numeric elements including a plurality of selectively illuminable segments arranged to define any decimal digit; each of said display blocks including a plurality of selectively illuminable graduation markers; an analog voltage source; means responsive to the analog voltage provided by said source for illuminating a corresponding graduation marker in each of said display blocks and for causing a first of said display blocks to display a number less than that represented by said analog voltage and a second of said display blocks, spaced a predetermined number of blocks from said first display block, to display a number greater than that represented by said analog voltage; a fixed reference marker positioned adjacent said display blocks; means for shifting said displayed numbers from said first and second display blocks in a first direction to third and fourth display blocks in response to a moderate increase in magnitude of said analog signal and in a second direction to fifth and sixth display blocks in response to a moderate decrease in magnitude of said analog signal; and means for illuminating a preceding graduation marker in each of said displayed blocks in response to a small increase in magnitude of said analog signal and a subsequent graduation marker in each of said displayed blocks in response to a small decrease in magnitude of said analog signal.

References Cited

UNITED STATES PATENTS

| | | | |
|---|---|---|---|
| 2,632,785 | 3/1953 | Knopp et al. | 324—122 |
| 2,858,632 | 11/1958 | Caserio et al. | 324—122 |
| 2,940,071 | 7/1960 | Kindred | 324—99 |
| 3,072,332 | 1/1963 | Margopoulous | 340—347 |
| 3,139,614 | 6/1964 | Gilson | 340—347 |
| 3,146,436 | 8/1964 | Crow | 340—336 |
| 3,217,293 | 11/1965 | Metz | 340—347 |
| 3,221,170 | 11/1965 | Sylvander | 315—169 |
| 3,255,449 | 6/1966 | Euler | 340—347 |
| 3,253,134 | 5/1966 | North | 340—146.2 |

NEIL C. READ, *Primary Examiner.*

A. J. KASPER, *Assistant Examiner.*